US011007838B2

(12) United States Patent
Bowden

(10) Patent No.: US 11,007,838 B2
(45) Date of Patent: May 18, 2021

(54) BASE UNIT FOR A VEHICLE

(71) Applicant: NIFTYLIFT LIMITED, Milton Keynes (GB)

(72) Inventor: Roger Bowden, Milton Keynes (GB)

(73) Assignee: NIFTYLIFT LIMITED, Milton Keynes (GB)

(*) Notice: Subject to any disclaimer, the term of this patent is extended or adjusted under 35 U.S.C. 154(b) by 74 days.

(21) Appl. No.: 16/492,073

(22) PCT Filed: Mar. 5, 2018

(86) PCT No.: PCT/GB2018/050548
§ 371 (c)(1),
(2) Date: Sep. 6, 2019

(87) PCT Pub. No.: WO2018/162882
PCT Pub. Date: Sep. 13, 2018

(65) Prior Publication Data
US 2020/0101809 A1  Apr. 2, 2020

(30) Foreign Application Priority Data
Mar. 7, 2017 (GB) .................... 1703607

(51) Int. Cl.
B60G 17/017 (2006.01)
B60G 17/016 (2006.01)
(Continued)

(52) U.S. Cl.
CPC ......... B60G 17/017 (2013.01); B60G 17/016 (2013.01); B66F 11/044 (2013.01);
(Continued)

(58) Field of Classification Search
CPC ............ B60G 17/017; B60G 17/016; B60G 2300/02; B60G 2400/051; B60G 2400/60;
(Continued)

(56) References Cited

U.S. PATENT DOCUMENTS 4,779,691 A * 10/1988 Werdner ............... B62D 57/00
180/8.1
6,443,687 B1 * 9/2002 Kaiser .................... E02F 9/024
180/209

(Continued)

FOREIGN PATENT DOCUMENTS

GB      2 334 015 A    8/1999
WO   WO 2014/060721 A1  4/2014

OTHER PUBLICATIONS

International Search Report & Written Opinion, dated May 23, 2018, in International Patent Application No. PCT/GB2018/050548.
(Continued)

Primary Examiner — Drew J Brown
(74) Attorney, Agent, or Firm — Knobbe, Martens, Olson & Bear LLP

(57) ABSTRACT

A base unit for a lifting vehicle includes a chassis having a chassis plane and a plurality of wheels, each of the wheels being mounted on the chassis by a suspension mechanism having a suspension element and a suspension actuator that controls the position of the suspension element relative to the chassis. The suspension element is arranged to pivot relative to the chassis about an inclined pivot axis in response to actuation of the suspension actuator.

22 Claims, 9 Drawing Sheets

(51) Int. Cl.
*B66F 11/04* (2006.01)
*B62D 9/00* (2006.01)

(52) U.S. Cl.
CPC .... *B60G 2300/02* (2013.01); *B60G 2400/051* (2013.01); *B60G 2400/60* (2013.01); *B60G 2500/30* (2013.01); *B62D 9/00* (2013.01)

(58) Field of Classification Search
CPC ............... B60G 2500/30; B66F 11/044; B66F 9/07513; B66F 9/07586; B66F 11/04; B62D 9/00

See application file for complete search history.

(56) References Cited

U.S. PATENT DOCUMENTS

| | | | | |
|---|---|---|---|---|
| 7,198,278 | B2* | 4/2007 | Donaldson | B62D 49/08 280/6.156 |
| 8,888,122 | B2* | 11/2014 | Berry | B60G 7/00 280/638 |
| 9,174,488 | B2* | 11/2015 | Berry | B66F 9/07522 |
| 2013/0020775 | A1* | 1/2013 | Beji | B62D 21/186 280/43 |
| 2015/0239318 | A1* | 8/2015 | Bowden | B60G 17/021 182/63.1 |
| 2015/0291233 | A1* | 10/2015 | Dames | B60B 35/1027 280/638 |
| 2017/0203628 | A1* | 7/2017 | Dames | B60G 17/0165 |
| 2017/0291802 | A1* | 10/2017 | Hao | B60G 9/02 |
| 2018/0170322 | A1* | 6/2018 | Gallione | B60S 9/10 |
| 2018/0333987 | A1* | 11/2018 | Ratcliffe | B62D 9/00 |
| 2019/0039430 | A1* | 2/2019 | Crook | B62D 7/06 |
| 2020/0140249 | A1* | 5/2020 | Hackenberg | B66F 9/07586 |
| 2020/0276877 | A1* | 9/2020 | Gao | B60G 17/0162 |
| 2020/0317486 | A1* | 10/2020 | Puszkiewicz | B66F 9/07559 |

OTHER PUBLICATIONS

International Application Status Report, dated Aug. 30, 2019, in International Patent Application No. PCT/GB2018/050548.

* cited by examiner

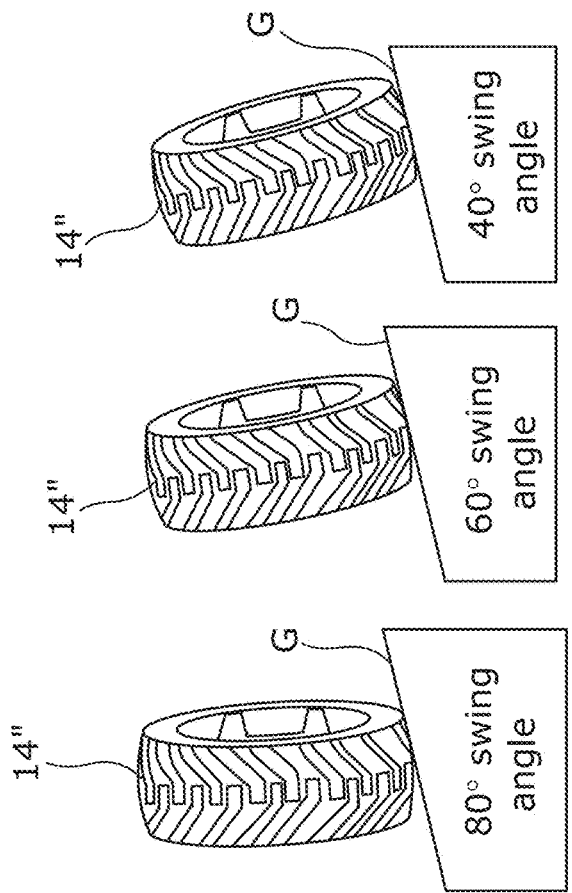
Fig. 4c
Fig. 4b
Fig. 4a
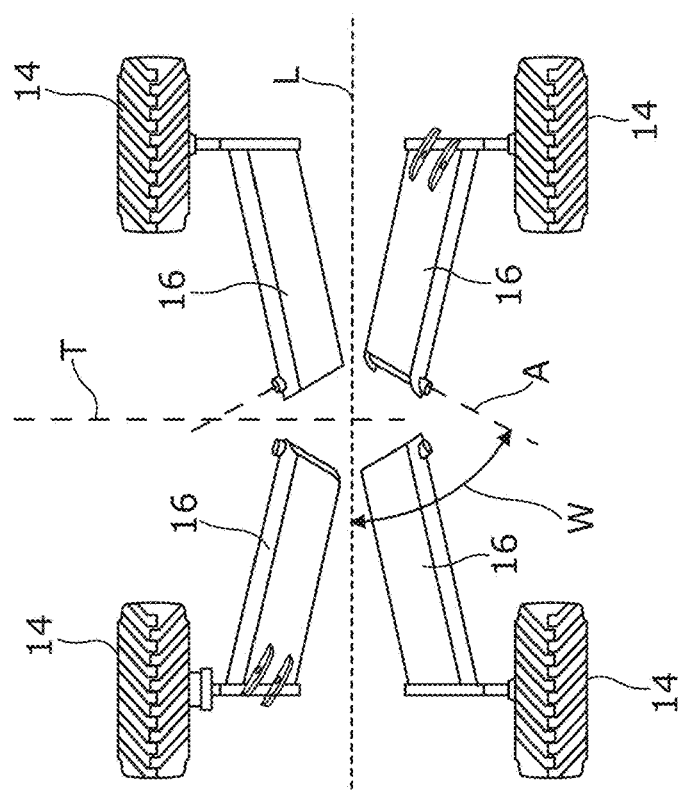
Fig. 3

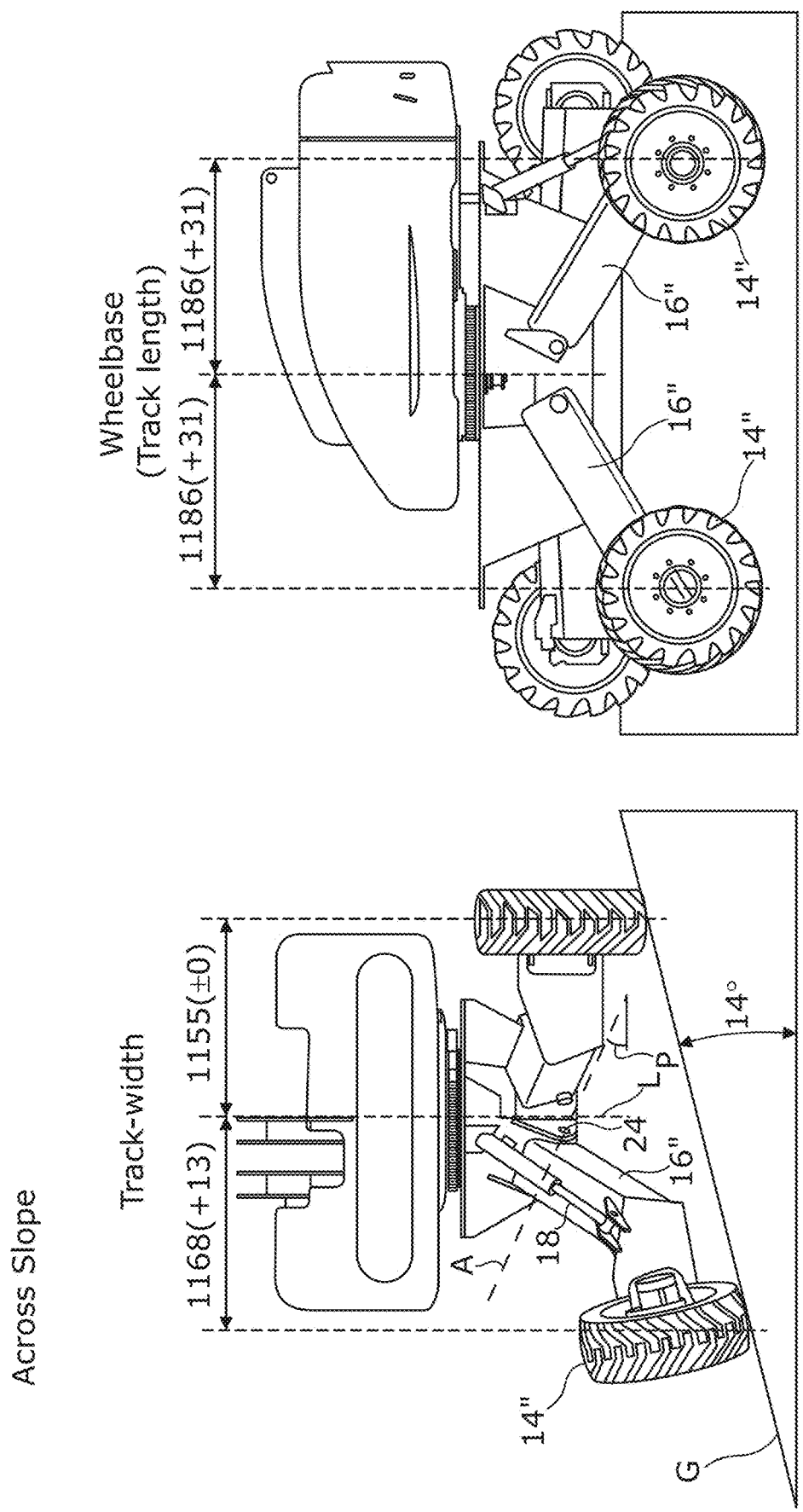

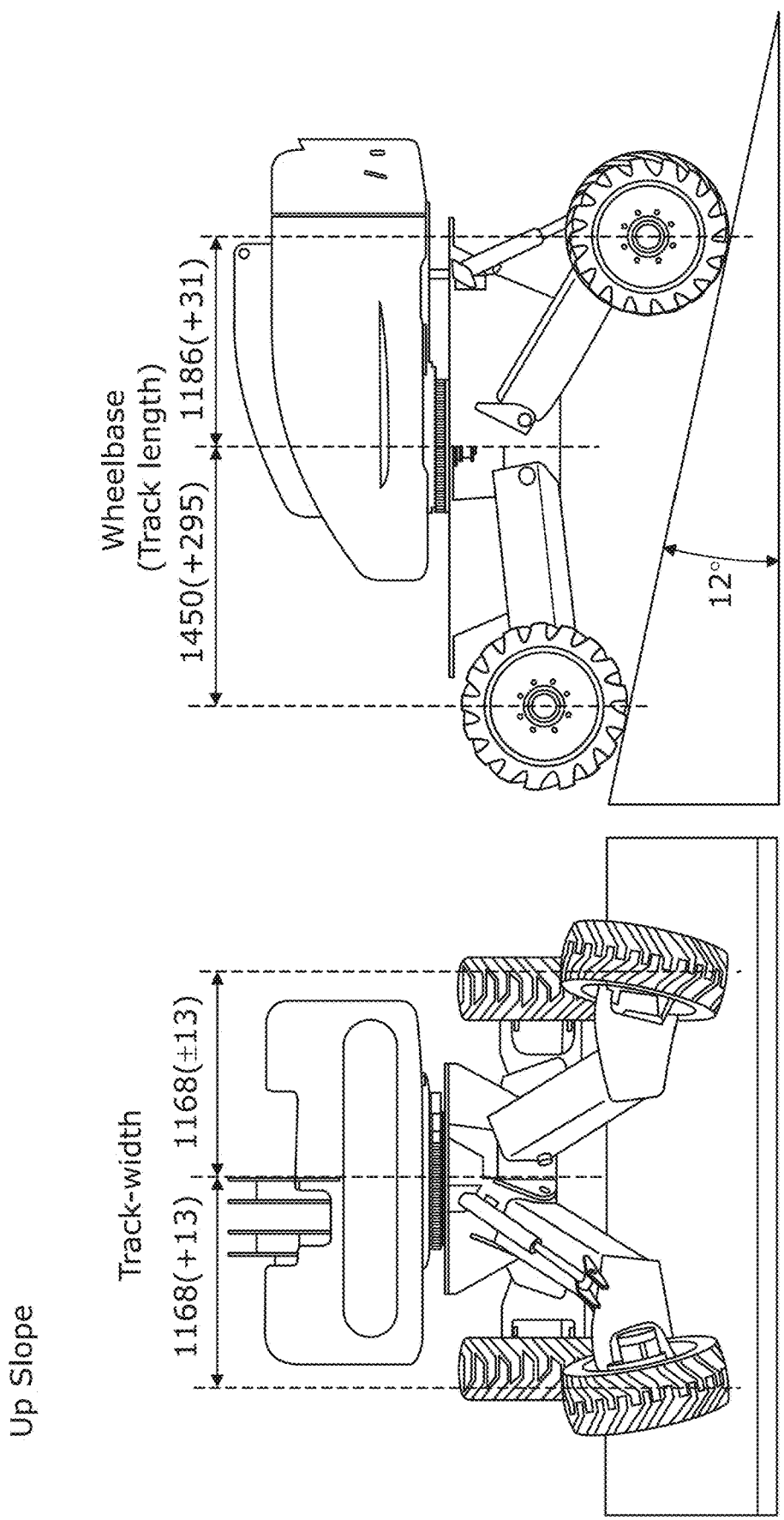

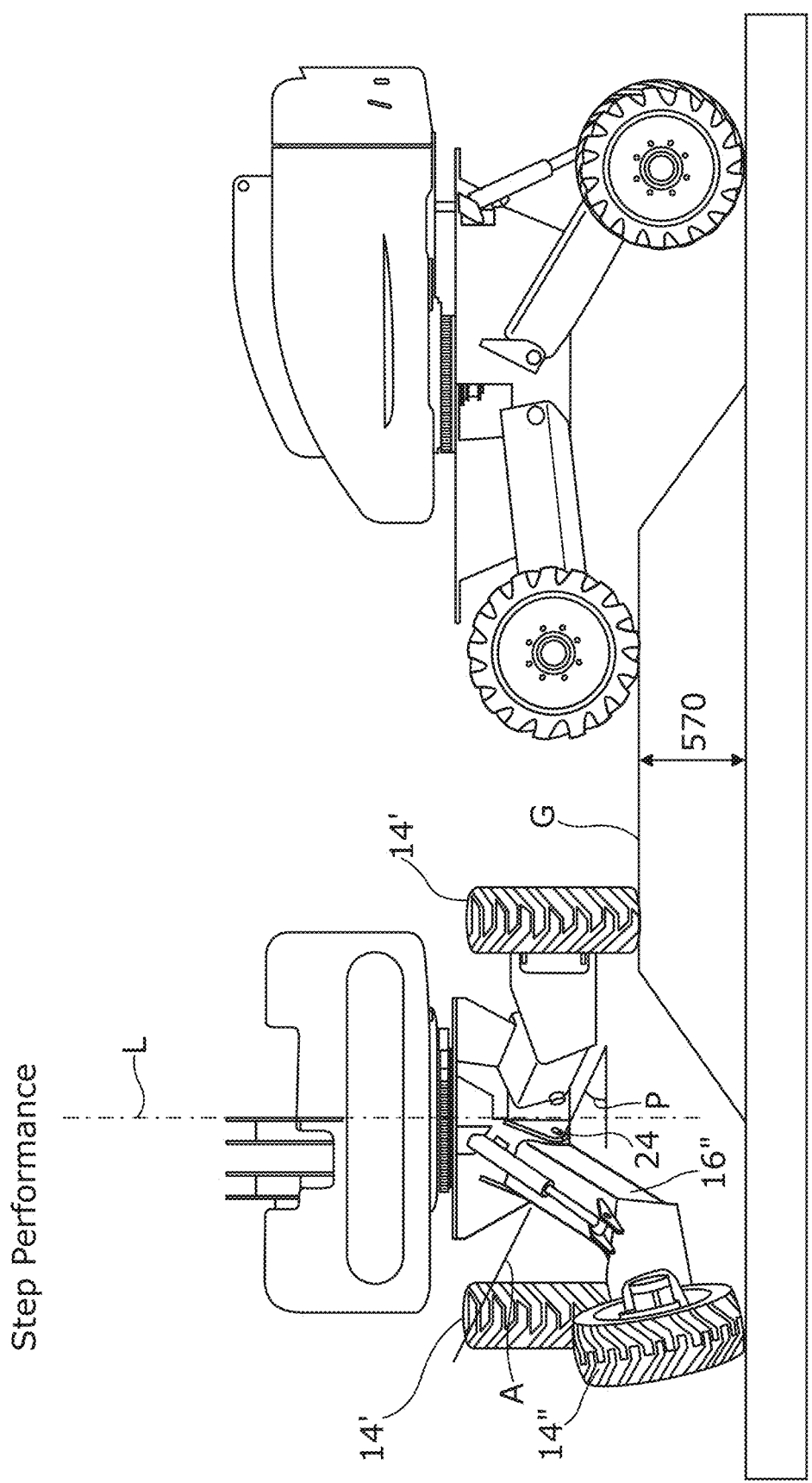

BASE UNIT FOR A VEHICLE

PRIORITY AND CROSS REFERENCE TO RELATED APPLICATIONS

This application is the U.S. National Stage Application under 35 U.S.C. § 371 of International Patent Application No. PCT/GB2018/050548, filed Mar. 5, 2018, designating the U.S. and published in English as WO 2018/162882 A1 on Sep. 13, 2018, which claims the benefit of GB Patent Application No. GB 1703607.0, filed Mar. 7, 2017. Any and all applications for which a foreign or a domestic priority is claimed is/are identified in the Application Data Sheet filed herewith and is/are hereby incorporated by reference in their entirety under 37 C.F.R. § 1.57.

FIELD

The present invention relates to a base unit for a vehicle.

SUMMARY

The present invention relates to a base unit for a vehicle, and in particular but not exclusively for a lifting vehicle that has a base unit and a lifting mechanism mounted on the base unit. For example, in one embodiment the invention relates to a base unit for a mobile elevating work platform (MEWP). The base unit may also be used with other lifting vehicles such as forklifts or telescopic handling machines ("telehandlers"). The invention also relates to a lifting vehicle having such a base unit.

BRIEF DESCRIPTION OF THE DRAWINGS

Certain embodiments of the invention will now be described, by way of example, with reference to the accompanying drawings, in which:

FIG. 3 is a plan view showing four swing arms, which form part of the base unit;

FIGS. 4a, 4b and 4c are front views showing how varying a swing angle of a swing arm affects the camber of a wheel when levelling a vehicle on a surface with transverse gradient;

FIG. 5 is a front view of a MEWP when standing on a surface with a transverse gradient;

FIG. 6 is a side view of a MEWP when standing on a surface with a transverse gradient;

FIG. 7 is a front view of a MEWP when standing on a surface with a longitudinal gradient;

FIG. 8 is a side view of a MEWP when standing on a surface with a longitudinal gradient;

FIG. 9 is a front view of a MEWP when standing on a surface with a transverse step;

FIG. 10 is a side view of a MEWP when standing on a surface with a longitudinal step;

DETAILED DESCRIPTION

Figure 1:
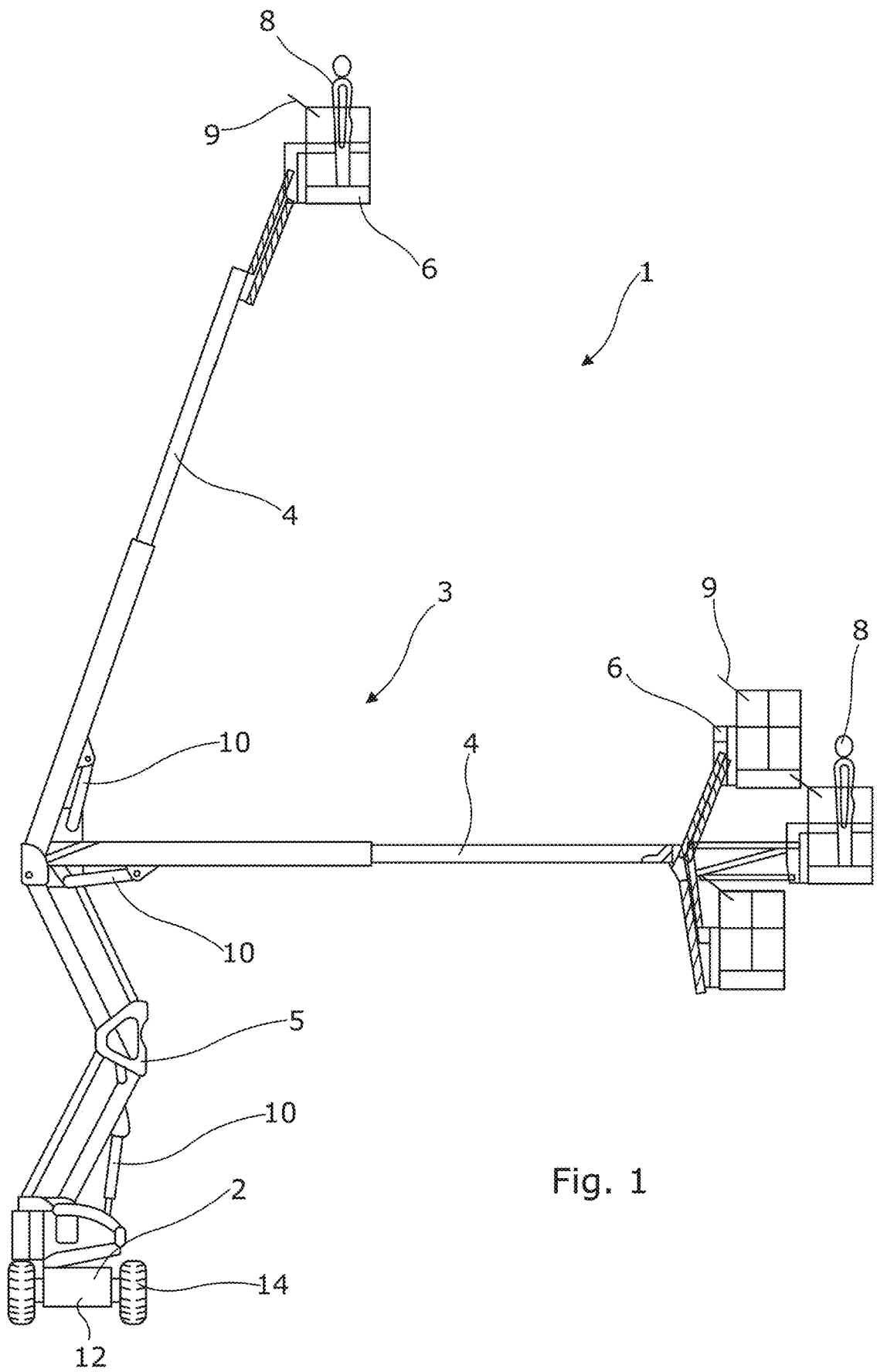
FIG. 1 is an end view of a mobile elevating work platform according to a first embodiment of the invention.

Mobile elevating work platforms (MEWPs) generally have a cage for an operator that is mounted on the end of a hydraulically-operated boom. The boom is mounted on a base unit and can be moved up and down or from side-to-side under the control of an operator in the cage. The base unit is provided with drive wheels and is fully mobile. It is stabilised by the weight of the base unit and a counterweight attached to the boom.

In one known type of MEWP the chassis of the base unit is entirely rigid: the wheels are mounted on rigid axles without any form of suspension and have very hard tyres. This provides the stability that is needed to ensure that the base unit does not tilt when the boom is extended to one side of the base unit. The base unit is very heavy, and the wheels and tyres provide a significant part of the weight of the base unit.

Operation of MEWPs (and other industrial lifting vehicles) is mostly limited to substantially flat, level ground, as the inclination of the base unit cannot be allowed to exceed the manufacturer's specified inclination limit (which is usually in the region of 5° to the horizontal). This reduces the versatility and productivity of the machine when operating in environments such as construction sites, where the ground may be sloped or uneven and the required support surface conditions may be unattainable. In addition, if the support surface is not flat one of the wheels may be suspended out of contact with the surface, which prevents drive from being transmitted through that wheel.

Some vehicles make use of additional stabilisers or outriggers to improve the stability of the vehicle when operating on adverse support surfaces. For example, some vehicles incorporate systems that attempt to reduce the vehicle's inclination by adjusting the vertical positions of the drive assemblies and wheels, in order to increase the stability of the vehicle. Usually, this is achieved through the use of an actuated support structure that connects one or more of the drive assemblies to the chassis. The support structure may comprise, for example, transverse swing arms, oscillating axles, trailing or leading swing arms, or vertical struts.

Although these mechanisms provide an effective means for adjusting the vertical positions of the drive assemblies, they do not effectively maintain the track width of the vehicle (i.e. the width in the horizontal plane between the points of contact with the ground). For example, in systems that use transverse swing arms or oscillating axles, the arc followed by the wheel will cause a reduction in the horizontal separation of the wheels, thus reducing the vehicle's track width. Alternatively, the use of trailing/leading swing arms or vertical struts may allow the chassis to be levelled, but does not adapt the wheel camber to the inclination of the support surface when the vehicle is standing on a sloped support surface. This causes the contact point with the support surface to transfer to the inside edge of the lower wheels, which reduces the track width of the vehicle.

GB2334015A describes a MEWP in which the base unit includes a suspension mechanism, wherein each drive wheel is mounted on a transverse swing arm. Each swing arm is arranged to pivot about a substantially horizontal pivot axis that extends in the drive direction of the vehicle (i.e. parallel to the longitudinal axis of the vehicle). A stop member is provided on the chassis that engages the swing arm to limit upwards movement of the arm. The swing arm normally engages the stop member when the mobile access platform is standing on flat, level ground so that the platform cannot tilt significantly, thus ensuring stability of the vehicle.

A biasing spring is connected to each swing arm, which biases the swing arm upwards towards the stop member. The biasing force is slightly less than the force needed to maintain the swing arm in engagement with the stop member when the wheel is unsupported. Therefore, when the MEWP is standing on uneven ground, one or other of the swing arms can pivot downwards from its normal position in engagement with the stop member, allowing the unsupported wheel to drop into contact with the ground. All four wheels can therefore maintain contact with the ground even when the platform is standing on or travelling over uneven ground. This maintains drive from both of the drive wheels. Also, as the swing arm is biased upwards towards the stop member, the weight of that arm and the associated wheel contribute to the overall weight of the base unit and to the stability of the platform.

WO2014/060721A1 describes another MEWP, which is similar to that described in GB2334015A, but which includes an actuator for adjusting the biasing force applied by the biasing spring. This makes it possible to increase the force applied to the ground by the dropped wheel, allowing drive to be applied to that wheel more effectively and reducing the risk that the wheel will slip against the ground when driving the vehicle.

A problem with the suspension mechanisms disclosed in both GB2334015A and WO2014/060721A1 is that when one of the transverse swing arms pivots downwards it moves closer to the longitudinal axis of the vehicle. This reduces the track width of the vehicle. This can be seen for example in FIGS. 5 & 6 of WO2014/060721A1, where FIG. 5 shows a swing arm 18b in the normal raised position in which it abuts a stop member 23b, and FIG. 6 shows the swing arm 18b in a dropped position. It can be clearly seen in these figures that when the swing arm is in a dropped position the track width of the vehicle (measured from the centreline of the vehicle to the outermost point of contact between the wheel 16b and the ground) is considerably reduced. This reduces the track width of the lifting mechanism, thereby reducing the operating range of the vehicle, particularly when the boom is extended to one side of the vehicle.

Another known suspension system uses trailing arms or leading arms, which pivot about a substantially horizontal axis that extends perpendicular to the direction of travel (i.e. parallel to the transverse axis of the vehicle). Using such a suspension system on a lifting vehicle avoids the problem that the wheels move inwards towards the longitudinal axis of the vehicle when the swing arms pivot downwards. However, the effective track width may still be reduced when the machine is standing on a transverse slope (or side slope), owing to the fact that only the inner edge of the dropped wheel may be in contact with the ground. This can affect the stability of the MEWP.

U.S. Pat. No. 7,198,278 describes another vehicle support system in which the wheels are connected to the chassis by first and second support assemblies that can rotate about substantially vertical pivot pins. This allows the wheels to be spread wide for maximum stability, or moved inwards, reducing the width of the machine for more convenient transportation and storage.

It is an object of the present invention to provide a base unit for a vehicle that mitigates one or more of the aforementioned disadvantages, or that provides one or more advantages over the previous arrangements.

According to one aspect of the present invention there is provided a base unit for a lifting vehicle, the base unit including a chassis having a chassis plane C and a plurality of wheels, each of said wheels being mounted on the chassis by a suspension mechanism comprising a suspension element and a suspension actuator that controls the position of the suspension element relative to the chassis, said suspension element being arranged to pivot relative to the chassis about an inclined pivot axis in response to actuation of the suspension actuator.

The suspension mechanism allows the positions of the wheels to be adjusted relative to the chassis, so as to maintain the chassis plane in a substantially horizontal position, even when the base unit is standing on a support surface that is inclined or uneven. This ensures the stability of the base unit and increases the versatility of the base unit (and of a lifting vehicle that includes such a base unit), allowing it to be operated in situations that would otherwise be unsuitable for operation. Because the suspension element is arranged to pivot relative to the chassis about an inclined pivot axis, the track width of the base unit can be maintained even when one or more of the wheels is dropped from its normal raised position into contact with a portion of the support surface that is lower than the portions engaged by the other wheels. The suspension mechanism also allows drive to be maintained to the drive wheels on a sloped or uneven support surface.

In an embodiment, the orientation of the pivot axis is defined by a swing angle W comprising the angle subtended between a vertical plane that passes through a longitudinal axis L of the vehicle and a vertical plane that contains the pivot axis A, wherein the swing angle W is in the range 5° to 85°. Advantageously, the swing angle W is in the range 40° to 80°, preferably 50° to 70°, more preferably approximately 60°. The selected range for the swing angle helps to adjust the camber of a dropped wheel, so as to maintain a good contact footprint with the support surface. Ideally, the camber of the dropped wheel is adjusted so that the plane of the wheel is substantially perpendicular to the plane of the support surface.

In an embodiment, the orientation of the pivot axis is defined by a spread angle P comprising the angle subtended between a chassis plane C and a plane that contains the pivot axis A and intersects the chassis plane C along a line that is parallel to the longitudinal axis L, wherein the spread angle P is in the range 5° to 85°. Advantageously, the spread angle P is in the range 10° to 40°, preferably 15° to 30°, more preferably approximately 20°. The selected range for the spread angle helps to maintain the track width of the base unit when one of the wheels is dropped into contact with a support surface, thus ensuring the stability of the base unit.

The base unit may include a plurality of driveable wheels and a drive mechanism for driving the driveable wheels, for example an electric or hydraulic drive mechanism. The drive mechanism may be configured to supply drive to some or all of the wheels of the base unit.

The base unit may include a plurality of steerable wheels and a steering mechanism for steering the steerable wheels. In an embodiment, the steerable wheels are independently steerable.

The base unit may include a suspension control system for controlling operation of the suspension actuators, said suspension control system being configured to maintain the chassis plane C in a substantially horizontal orientation.

In an embodiment, the suspension control system is configured for manual operation in response to input signals entered by a human operator.

In another embodiment, the suspension control system is configured for automatic operation in response to input signals received from one or more sensors (possibly also with the option of manual operation). The one or more sensors may include a level sensor that senses the orientation of the chassis plane C and/or one or more load sensors that sense a load acting on one or more of the wheels.

According to another aspect of the present invention there is provided a lifting vehicle including a base unit according to any one of the preceding statements of invention, and a lifting mechanism mounted on the base unit that is configurable alternatively in a raised condition or a lowered condition.

In an embodiment, the lifting vehicle may include a control system that controls operation of the lifting mechanism, the suspension mechanism and a drive mechanism that drives the wheels, wherein the control system has one or more of the following operational modes:

- a rigid drive mode, in which the drive mechanism is enabled, the lifting mechanism is enabled, and the suspension mechanism is disabled, allowing the vehicle to be driven with the lifting mechanism in a raised condition, for example when the support surface is flat and level;
- a levelling mode, in which the drive mechanism is disabled, the lifting mechanism is disabled and is in a lowered configuration, and the suspension mechanism is enabled, allowing the vehicle to be levelled when on a support surface that is not flat and level;
- a levelled elevating mode, in which after the base unit has been levelled and a wheel load is sensed at each of the wheels that exceeds a predetermined value, the suspension mechanism and the drive mechanism are disabled to ensure the stability of the base unit, and the lifting mechanism is enabled allowing it to be raised;
- and an active drive mode, in which the drive mechanism is enabled, the lifting mechanism is disabled, and the suspension mechanism is enabled, so that the positions of the wheels can be adapted to the contours of the ground, allowing drive to be maintained to all of the wheels as the vehicle travels over rough ground.

The control system may be configured such that the active drive mode can be selected only when the lifting mechanism is in a lowered configuration, to ensure that the stability of the vehicle is not compromised when driving over rough ground. However, if the suspension mechanism is able to react quickly enough to changes in the contours of the support surface so as to maintain the base unit in a level and stable condition while driving over rough ground, it may also be possible to engage the active drive mode even when the lifting mechanism is in a raised condition.

The control system may be configured to receive wheel load signals from wheel load sensors associated with the wheels, and to adjust the suspension mechanism to maintain at least a minimum load between the wheels and a support surface, thus ensuring the stability of the base unit and also ensuring that drive can be transmitted through all of the wheels.

The control system may additionally be configured to control operation of the steering mechanism, allowing for active steering control.

In an embodiment, the lifting vehicle is a mobile elevating work platform having a work platform mounted on said lifting mechanism. The invention is also applicable to other types of lifting vehicle, for example forklifts or telehandlers.

FIG. 1 shows a mobile elevating work platform 1 according to an embodiment of the invention, which includes a wheeled base unit 2, a hydraulically operated lifting mechanism 3 that comprises an extending boom 4 and a rising structure 5, a cage 6 for a human operator 8, and a control console 9 mounted in the cage 6, which can be operated by the operator 8 to control operation of the MEWP. The boom 4, which is shown here in two different operating positions, may be retracted and folded onto the wheeled base unit 2 for transportation or storage. Movement of the lifting mechanism 3 is controlled by various hydraulic cylinders 10, which are connected to a hydraulic drive system (not shown) that is controlled via the control console 9.

The components of the MEWP as described above are all conventional and will not therefore be described in further detail. It should be understood however that the mobile elevating work platform may take various alternative forms. For example, the operator cage 6 may mounted to the base unit 2 via a lifting mechanism comprising a scissor lift, or any other suitable lifting mechanism. The present invention is also applicable to other types of lifting vehicle including for example forklifts and telescopic handling machines.

Figure 2:
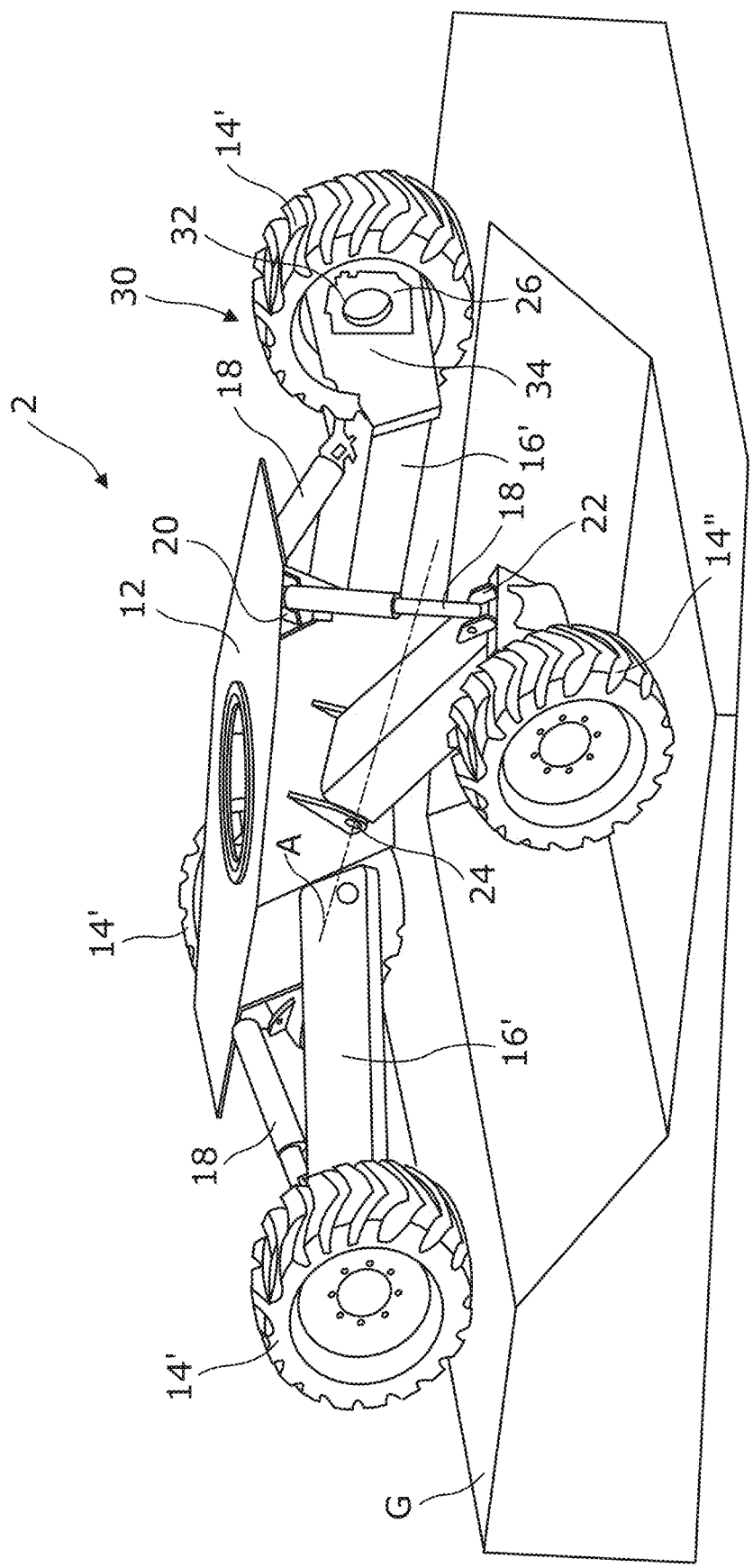
FIG. 2 is an isometric view showing a base unit for a mobile elevating work platform in a first operating configuration.

As illustrated in FIG. 2, the base unit 2 includes a chassis 12 having a longitudinal axis L and a transverse axis T, and four wheels 14, each of which is mounted to the chassis 12 via a semi-trailing swing arm 16. Each swing arm 16 is pivotally mounted to the chassis 12 for pivoting movement about an inclined pivot axis A, which is neither horizontal nor vertical, nor parallel to the longitudinal and transverse axes of the vehicle. The orientation of the pivot axis A is defined by reference to a swing angle W and a spread angle P.

As shown in FIG. 3, the swing angle W is defined as the angle subtended between the vertical plane that passes through the longitudinal axis L of the vehicle and the vertical plane that contains the pivot axis A. Put more simply, the swing angle W is the apparent angle in a horizontal plane between the pivot axis A and the longitudinal axis L. In a preferred embodiment, the swing angle W is in the range 40° to 80°, preferably 50° to 70° and more preferably approximately 60°.

Figure 11:
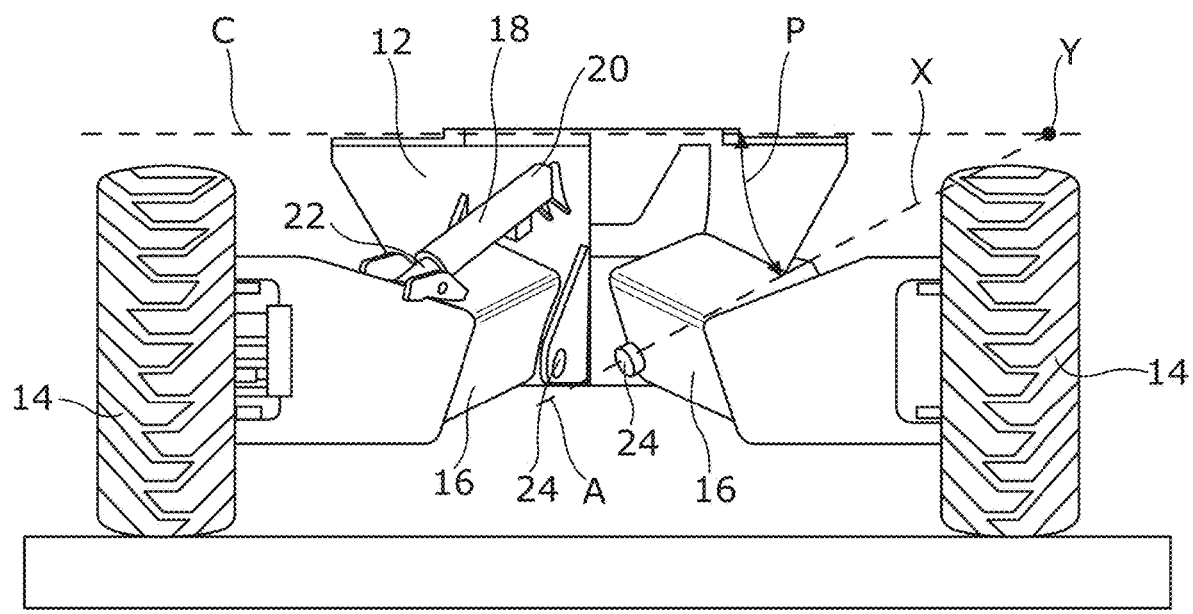
FIG. 11 is a front view of a MEWP showing part of the base unit when standing on a horizontal support surface.

As shown in FIG. 11, the spread angle P is the angle subtended between the chassis plane C (which is normally the horizontal plane when the vehicle is standing on flat, level ground) and the plane that contains the pivot axis A and intersects the chassis plane C along a line that is parallel to the longitudinal axis L of the vehicle. Again, the spread angle P can be described more simply as the apparent angle between the pivot axis A and the chassis plane C when viewed in a direction parallel to the longitudinal axis L (i.e. as shown in FIG. 11). In a preferred embodiment, the spread angle P is in the range 10° to 40°, preferably 15° to 30°, more preferably approximately 20°.

The orientation of each swing arm 16 relative to the chassis 12 can be controlled and adjusted by means of an actuator 18, which is connected between the chassis 12 and the swing arm 16. In this embodiment, the actuator 18 is a linear actuator, for example a hydraulic actuator or an electric actuator, which is connected between a first pivot joint 20 attached to the chassis 12, and a second pivot joint 22 that is attached to the swing arm 16 towards the free end of the arm. Alternatively, the actuator 18 may for example be a rotary actuator that controls rotation of the swing arm 16 about the pivot axis A of the swing arm pivot 24.

One or more of the wheels 14 may be drive wheels. The drive wheels may be driven, for example, by hydraulic or electric drive motors 26. Although in this embodiment only two of the wheels are driven it should be understood that all of the wheels may be driven.

Two or more of the wheels 14 may be steerable and may include a steering mechanism 30 for adjusting the steering angle of the wheel relative to the swing arm. In this embodiment each steerable wheel 14 is attached to the respective swing arm 16 via a pivot mechanism 32 that allows the wheel to rotate about a substantially vertical pivot axis, and the steering angle of the wheel is controlled by an actuator 34, for example a hydraulic actuator, that is connected between the wheel 14 and the swing arm 16. In a preferred embodiment, all four wheels are steerable. The steering mechanism may allow the steering angles of the wheels to be adjusted independently, allowing for a wide range of steering manoeuvres, including crabbing movement of the vehicle (in a transverse direction).

The effect of selecting a non-zero spread angle P on the track width of a MEWP will now be discussed with reference to FIGS. 2, 5, 6, 9 and 12.

In FIGS. 2 and 9, the base unit 2 of a MEWP is shown on a stepped support surface G, wherein three of the wheels 14' are located on an upper part of the stepped support surface G and one of the wheels 14" is located on a lower part of the support surface. The swing arms 16' attached to the first three wheels 14' are located in their uppermost positions and the remaining swing arm 16" of the fourth wheel 14" is pivoted downwards so that the wheel 14" drops into contact with the lower part of the support surface G. The positions of the swing arms 16'/16" are adjusted by means of the actuators 18 to maintain the chassis 12 in a horizontal, level position, despite the uneven contours of the stepped support surface G. Once the chassis 12 has been levelled, the actuators 20 are hydraulically locked to prevent any further movement of the chassis 12 relative to the support surface G, and to lock it in a horizontal, level position, thus ensuring the stability of the MEWP.

The effect of providing a non-zero spread angle P can be seen most clearly in FIG. 9, which shows a rear view of the MEWP on the stepped support surface G. The dropped wheel 14" can be seen, as well as two of the raised wheels 14'. Because the pivot axis A of the pivot pin 24 is inclined at the spread angle P, when the swing arm 16" pivots downwards to bring the wheel 14" into contact with the lower part of the support surface G, it causes the wheel 14" to move away from the centre line L of the chassis 12, thus increasing the track width of the MEWP. This can be seen most clearly by comparing the position of the dropped wheel 14" with that of the raised wheel 14' that is located behind the dropped wheel. It may be noted that the dropped wheel 14" is also inclined outwards, so that the outer edge of the wheel is in contact with the ground. This also increases the effective track width of the vehicle. The inclination of the wheel 14" depends on the value of the swing angle W.

FIG. 5 shows a similar situation, in which the MEWP is standing on a sloping support surface G, in this example having a transverse inclination of 14°. Again, the dropped wheel 14" can be seen, as well as two of the raised wheels 14'. Because the pivot axis A of the pivot pin 24 is inclined at the spread angle P, when the swing arm 16" pivots downwards to bring the wheel 14" into contact with the lower part of the sloped support surface G, it causes the wheel 14" to move away from the centre line L of the chassis 12, thus increasing the track width of the MEWP.

As before, the dropped wheel 14" is also inclined outwards, as a result of the swing angle W. However, in this case, because the support surface G is also inclined, the wheel 14'/14" remains substantially perpendicular to the support surface ensuring optimum contact with the surface for maximum stability, and also providing near perfect traction.

The effect of changing the swing angle W is illustrated in FIGS. 4a to 4c. In FIG. 4a, the swing angle is 80° and as a result the wheel 14" is almost vertical, and the weight is carried by the inside edge of the wheel. In FIG. 4b, the swing angle is 60° and the wheel 14" is substantially perpendicular to the support surface G. In FIG. 4c the swing angle is 40° and as a result the wheel 14" is inclined outwards and the weight is carried by the outer edge of the wheel. In this embodiment the swing angle W is preferably in the range 40° to 80°, and is ideally about 60°.

Figure 12:
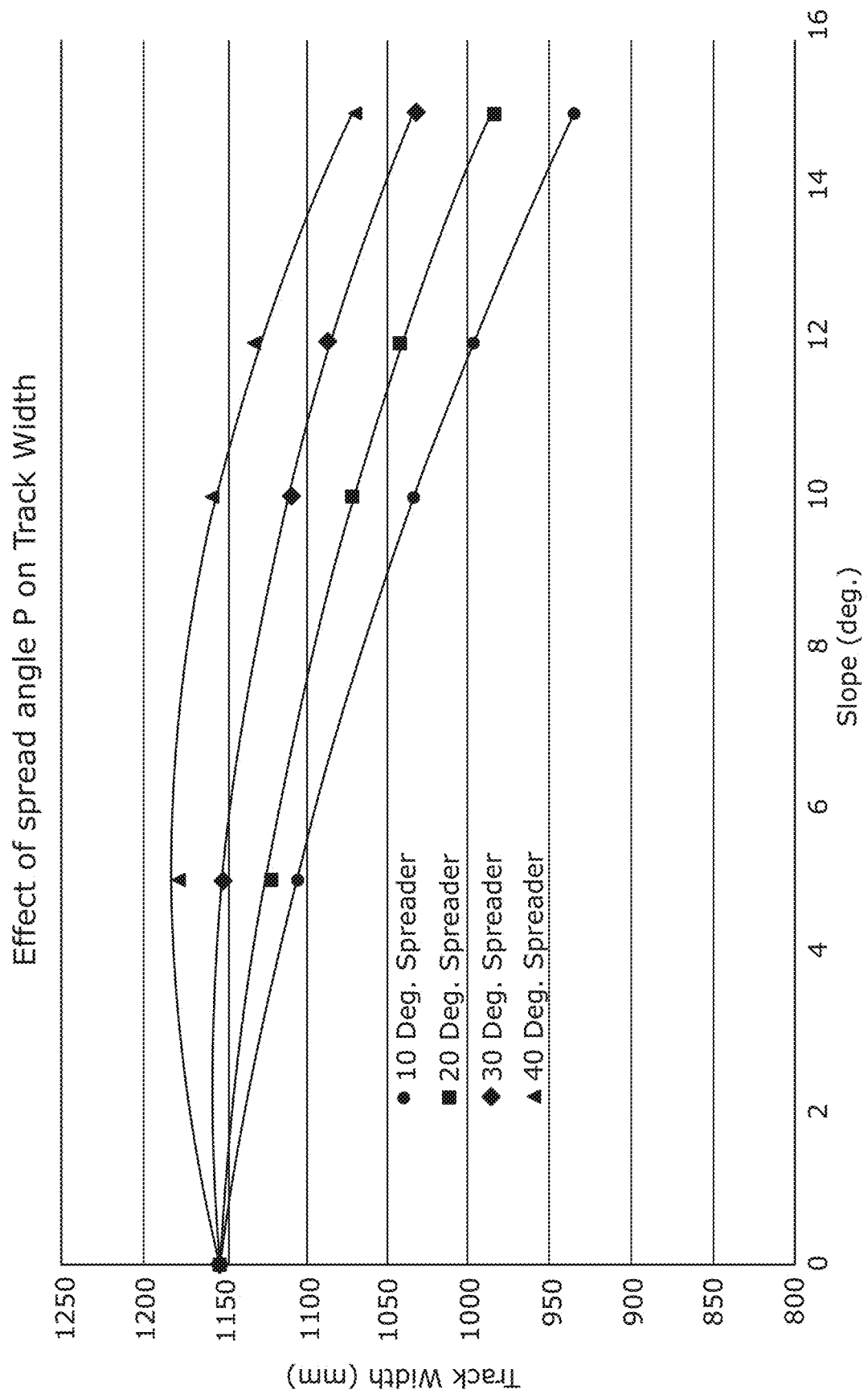
FIG. 12 is a chart illustrating how varying the spread angle affects the track width of a vehicle in an embodiment of the invention.

The effect of spread angle P on the track width is illustrated in FIG. 12, which shows for one particular embodiment of the invention the relationship between track width (mm) and the slope of the support surface for four different spread angles. With a spread angle P of 10° the track width has a maximum value when the support surface has a slope of 0° (i.e. the support surface is flat and horizontal). As the slope of the support surface increases, the track width decreases from a maximum value of 1150 mm to a value of approximately 940 mm at a slope of 15°.

With a spread angle P of 20° the track width is again a maximum at a slope of 0° and decreases from a maximum value of 1150 mm to approximately 980 mm at a slope of 15°.

With a spread angle P of 30° the track width increases very slightly up to a slope of approximately 2°, and then decreases to a value of approximately 1030 mm at a slope of 15°.

With a spread angle of 40° the track width increases from 1150 mm at a slope of 0° to a value of approximately 1180 mm at a slope of about 5°, and then decreases to a track width of approximately 1070 mm at a slope of 15°. However, it can be seen that for a slope between 0° and 10° the track width is greater than it is at a slope of 0°. Therefore, in this embodiment, a spread angle of approximately 40° provides a useful increase in track width for slopes of up to 10°.

One consequence of providing a spread angle P that causes an increase in the track width when the MEWP is located on a transverse slope, is that there is a corresponding decrease in the length of the wheel base (i.e. in the track length of the MEWP). This is illustrated for example in FIGS. 5 and 6, which provide respectively rear and side views of a MEWP standing on a transverse slope. In FIG. 5 the track width measured from the centre line L to the dropped wheel 14" is 1168 mm, which provides an increase of 13 mm compared to the "normal" track width of 1155 mm when the MEWP is standing on a flat, horizontal support surface. However, as shown in FIG. 6, pivoting of the swing arms 16" of the dropped wheels also reduces the track length from 1450 mm to 1186 mm This decrease in track length is however acceptable since the length of the wheel base is considerably greater than the track width, and a small decrease in the track length does not significant affect the overall stability of the MEWP. In this case, although the track length has been reduced to 1186 mm, this is still 31 mm greater than the normal track width of 1155 mm The invention also increases the track width of the vehicle when it is standing on an upslope or downslope. For example, when the vehicle is standing on an upslope as shown in FIGS. 7 and 8, the rear wheels 14" drop downwards to maintain the chassis 12 in a horizontal position, and as a result of the spread angle P, the track width of the rear wheels is increased, in this case by 13 mm from 1155 mm to 1168 mm The track width of the front wheels 14' remains the same as when the MEWP is standing on flat horizontal ground, providing a track width of 1155 mm As shown in FIG. 8, the track length of the front wheels remains unchanged at 1450 mm (295 mm greater than the track width), whereas the track length of the rear wheels 14" is decreased to 1186 mm (which is still 31 mm greater than the track width). Therefore, the stability of the MEWP is not compromised.

Operation of the hydraulic actuators 18 may be controlled automatically, for example by an electronic control unit, or by the machine operator, via the control console 9. For example, the actuators may be activated automatically in response to receiving an actuation signal from a level sensing device mounted on the base unit. The control system may additionally receive signals from sensors that are configured to sense the force between the wheels and the support surface, and may be configured to adjust the actuators 18 so as to maintain a substantially equal force on each of the wheels.

The MEWP may also include a control system for controlling operation of the lifting mechanism, which is configured to control operation of the lifting mechanism according to the stability of the base unit. For example, the control system may be configured to prevent operation of the lifting mechanism unless the chassis of the vehicle is level and stable. The control system may also prevent operation of the vehicle drive system unless the lifting mechanism is in a stowed condition, or may restrict drive to a low speed, so that the levelling mechanism can react to changes in the contour of the support surface and maintain the chassis in a stable level condition.

Figure 13:
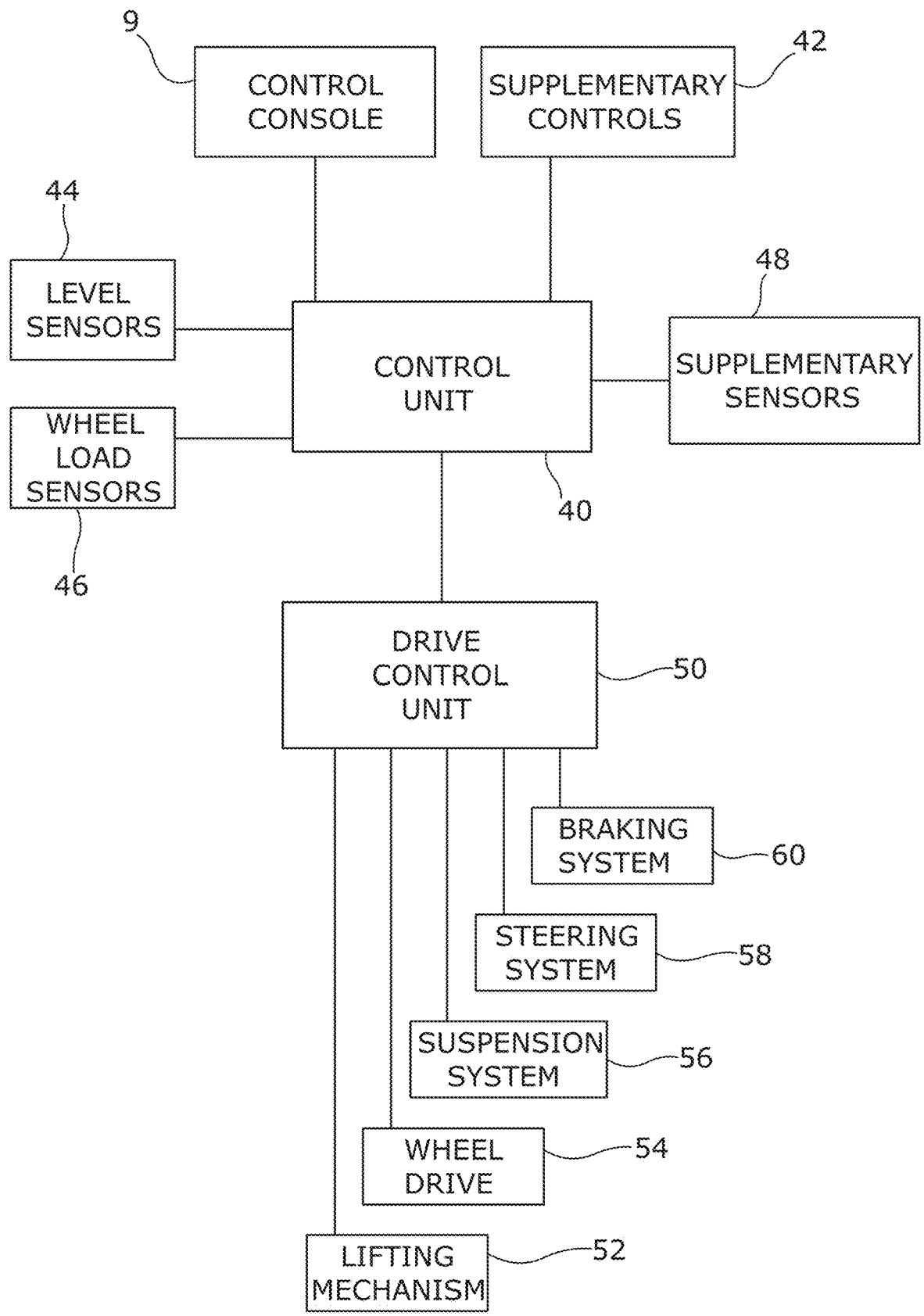
FIG. 13 illustrates schematically an exemplary control system that forms part of a MEWP according to an embodiment of the invention.

One possible configuration of a control system is shown in FIG. 13. The control system includes a control unit 40, for example an electronic processor, which is connected to receive control signals from the control console 9 and optionally from one or more supplementary controls 42 (for example, a foot pedal, an override control etc.). The control unit 40 is also connected receive sensor signals from one or more level sensors 44, wheel load sensors 46 and/or supplementary sensors 48. The level sensors 44 may be mounted for example on the base unit to sense the orientation of the base unit, and/or at other locations, for example in the operator cage of a MEWP. The wheel load sensors 46 are configured to sense the load applied to the ground or support surface by one or more of the vehicle wheels. The optional supplementary sensors 48 may be provided to sense other factors, for example the load carried by the lifting structure, or a crush force applied to the operator cage or an operator in the cage by colliding with an obstruction.

The control unit 40 is connected to a drive control unit 50, which controls the operation of various motors, systems and actuators that permit operation of the lifting vehicle, including for example one or more of the lifting mechanism 52, the wheel drive system 54, the suspension system 56, the steering system 58 and the braking system 60.

The control unit 40 is configured to sense control signals received from the control console 9 and optionally from one or more supplementary controls 42, and sensor signals received from the sensors 44, 46, 48, and in response to those signals generates drive signals that are delivered to the drive control unit 50, which accordingly controls operation of the lifting mechanism 52, the wheel drive system 54, the suspension system 56, the steering system 58 and the braking system 60.

A lifting vehicle according to an embodiment of the invention may have one or more of the following modes of operation.

Elevated Drive Mode

This mode may be enabled when the machine is operating on a flat, level support surface, for example with an inclination of less than 5°. Elevated drive is then enabled, allowing the vehicle to be driven with the lifting mechanism in a raised position. In this mode steering will also be enabled and the suspension will be locked in a rigid configuration with the wheels fixed in the up position for maximum stability.

Levelling Mode

In this mode a levelling function may be enabled providing that the lifting mechanism is in a stowed configuration and the vehicle is static with no drive to the wheels. In this mode manually controlled levelling may be enabled, allowing an operator to control the position of the individual swing arm assemblies in order to level the base unit. Alternatively, an automatic levelling mode may be enabled, in which the orientation of the base unit is sensed using levelling sensors and the positions of the swing arm are adjusted automatically in order to level the base unit. In addition, wheel load feedback signals may be monitored to ensure that each of the wheels is firmly in contact with the ground and, optionally, to ensure that the load is spread substantially equally between the different wheels. For example, the loads on the wheels may be monitored to ensure that the load on each wheel exceeds a predetermined minimum value. During each of these levelling operations the wheels may be steered to predetermined angles to minimise scrub when levelling the vehicle and to optimise the contact patches between the wheels and support surface. Braking may also be applied to one or more of the wheels individually to assist with the levelling process.

Levelled Elevating Mode

Once the base unit has been levelled as described above in the levelling mode, control system may enter a levelled elevating mode, in which drive is restored to the lifting mechanism, allowing the lifting mechanism to be raised. During operation in the levelled elevating mode drive to the wheels is disabled, the wheel brakes are applied and the positions of the swing arms are locked to prevent movement of the base unit, ensuring maximum stability of the machine.

Active Drive Mode

This mode may be enabled when driving the vehicle over rough terrain with the lifting mechanism in a stowed condition. The positions of the swing arms may then be adjusted automatically to provide a predetermined amount of pressure to each actuator, so as to maintain an adequate force between each wheel and the support surface so as to prevent wheel slippage. Optionally, the mode may also provide active traction aiding by controlling the individual cylinder pressures based on the chassis inclination and wheel loads. The operational mode may also allow for traction control and/or wheel spin control, wheel toe compensation wherein a steering adjustment is applied based on the swing arm positions, so as to compensate for wheel toe, and two or four wheel steering (including crab steering).

The following interlocks and safety functions may also be provided. In an elevated mode a levelling interlock may be provided which ensures that all swing arms are locked into the up position, thus maximising the stability mass and providing a rigid suspension. A drive interlock may be provided that prevents driving on inclines exceeding 5° when the lifting-mechanism is in an elevated position. A boom interlock (or lifting mechanism interlock) may also be provided, to prevent the lifting mechanism being elevated from a stowed position when the inclination of the support surface exceeds 5°.

In the levelling mode the control system may include a boom interlock, in which the booms (or lifting mechanism) cannot be elevated from the stowed condition until all wheels are in contact with the ground and the base unit is level. This mode may also include wheel load monitoring, to ensure that each of the wheels is firmly in contact with the ground and, optionally but not necessarily, to ensure that the load is spread substantially equally between the wheels.

Levelling Correction Mode

Optionally, the suspension system may be activated to vary the orientation of the base unit slightly (i.e. apply a small inclination to the base unit), to correct for compliance errors in other parts of the vehicle, such as slight bending under load of the booms that form the lifting structure, or play in the joints.

For example, whilst in elevated mode, such as during outreach, the machine could use the load cell, leg position sensors and level sensors of the operator platform and the chassis angle to sense the overturning moment and positively level the machine to increase the stability of the machine. Such a correction will generally be restricted to only a few degrees, counteracting the overturning moment as the machine structure complies under load.

A slew position sensor may also be useful as this could sense an outreach position worse case situation (e.g. when extended over one side of the base unit) and be a counter-check to the other sensors. The system may also be configured to sense a telescopic function of the lifting structure and re-level the suspension mechanism back to a level position when the lifting structure is drawn back towards the centre of gravity of the base unit.

What is claimed is:

1. A base unit for a lifting vehicle, the base unit comprising a chassis having a chassis plane C and a plurality of wheels, each of said wheels being mounted on the chassis by a suspension mechanism comprising a suspension element and a suspension actuator that controls the position of the suspension element relative to the chassis, said suspension element being arranged to pivot relative to the chassis about an inclined pivot axis in response to actuation of the suspension actuator.

2. The base unit according to claim 1, wherein the orientation of the pivot axis is defined by a swing angle W comprising the angle subtended between a vertical plane that passes through a longitudinal axis L of the vehicle and a vertical plane that contains the pivot axis A, wherein the swing angle W is in the range 5° to 85°.

3. The base unit according to claim 2, wherein the swing angle W is in the range 40° to 80°.

4. The base unit according to claim 2, wherein the swing angle W is in the range 50° to 70°.

5. The base unit according to claim 2, wherein the swing angle W is approximately 60°.

6. The base unit according to claim 1, wherein the orientation of the pivot axis is defined by a spread angle P comprising the angle subtended between a chassis plane C and a plane that contains the pivot axis A and intersects the chassis plane C along a line that is parallel to the longitudinal axis L, wherein the spread angle P is in the range 5° to 85°.

7. The base unit according to claim 6, wherein the spread angle P is in the range 10° to 40°.

8. The base unit according to claim 6, wherein the spread angle P is in the range 15° to 30°.

9. The base unit according to claim 6, wherein the spread angle P is approximately 20°.

10. The base unit according to claim 1, wherein the base unit comprises a plurality of driveable wheels and a drive mechanism for driving the driveable wheels.

11. The base unit according to claim 1, the base unit comprises a plurality of steerable wheels and a steering mechanism for steering the steerable wheels.

12. The base unit according to claim 11, wherein the steerable wheels are independently steerable.

13. The base unit according to claim 1, comprising a suspension control system for controlling operation of the suspension actuators, said suspension control system being configured to maintain the chassis plane in a substantially horizontal orientation.

14. The base unit according to claim 13, wherein the suspension control system is configured for manual operation in response to input signals entered by a human operator.

15. The base unit according to claim 13, wherein the suspension control system is configured for automatic operation in response to input signals received from one or more sensors.

16. The base unit according to claim 15, wherein the one or more sensors comprises a level sensor that senses the orientation of the chassis plane C and/or one or more load sensors that sense a load acting on one or more of the wheels.

17. A lifting vehicle comprising a base unit according claim 1, and a lifting mechanism mounted on the base unit that is configurable alternatively in a raised condition or a lowered condition.

18. The lifting vehicle according to claim 17, comprising a control system that controls operation of the lifting mechanism, the suspension mechanism and a drive mechanism that drives the wheels, wherein the control system has one or more of the following operational modes:
 a. a rigid drive mode, in which the drive mechanism is enabled, the lifting mechanism is enabled, and the suspension mechanism is disabled;
 b. a levelling mode, in which the drive mechanism is disabled, the lifting mechanism is disabled and is in a lowered configuration, and the suspension mechanism is enabled;
 c. a levelled elevating mode, in which the suspension mechanism is disable, the drive mechanism is disabled, and the lifting mechanism is enabled, and
 d. an active drive mode, in which the drive mechanism is enabled, the lifting mechanism is disabled, and the suspension mechanism is enabled.

19. The lifting vehicle according to claim 18, in which the control system is configured such that the active drive mode can be selected only when the lifting mechanism is in a lowered configuration.

20. The lifting vehicle according to claim 18, in which the control system is configured to receive wheel load signals from wheel load sensors associated with the wheels, and to adjust the suspension mechanism to maintain at least a minimum load between the wheels and a support surface.

21. The lifting vehicle according to claim 18, in which the control system additionally controls operation of the steering mechanism.

22. The lifting vehicle according to claim 17, wherein the lifting vehicle is a mobile elevating work platform having a work platform mounted on said lifting mechanism.

* * * * *